United States Patent Office 2,886,299
Patented May 12, 1959

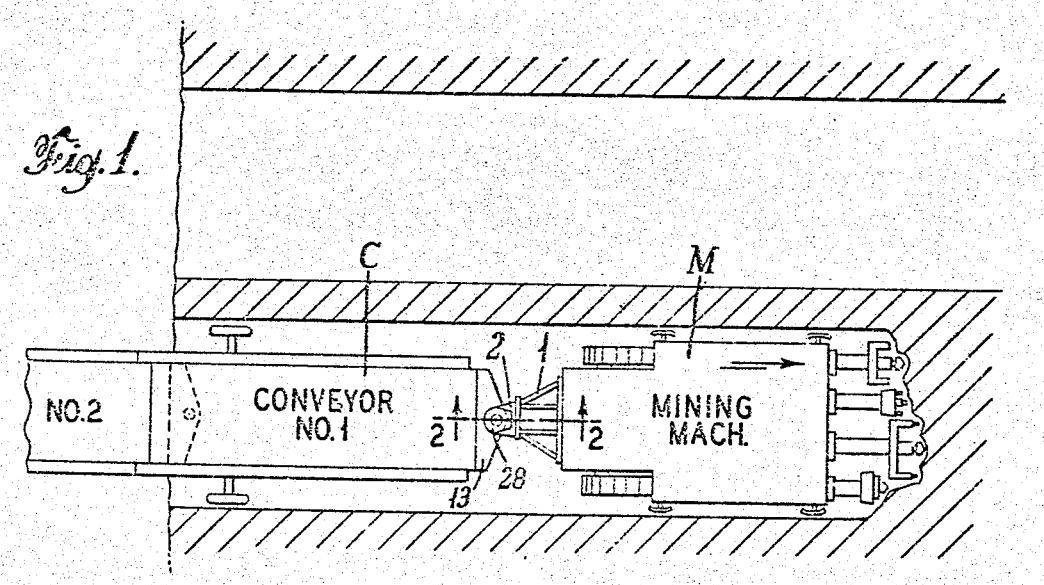

2,886,299

BORE MINING APPARATUS HAVING MEANS TO MEASURE THE ANGLE BETWEEN UNITS THEREOF

John W. Heimaster, Charleston, and Roy L. McNeill, South Charleston, W. Va., assignors to Union Carbide Corporation, a corporation of New York Application April 30, 1956, Serial No. 581,728

10 Claims. (Cl. 262—7)

This invention relates to remotely controlled bore mining, and more particularly to a novel apparatus for plotting of the exact location of a bore mining machine during the hole boring progress thereof.

For successful operation of a remotely controlled bore mining machine, it is essential that the horizontal position of the machine with respect to the starting point be known at any instant, so that the machine may be guided to follow a desired path. This is particularly true of its location in a horizontal plane, so that adjacent bore holes can be made parallel or equally spaced apart to leave a wall of uniform thickness therebetween.

One way of determining the location of the machine is by triangulation, in which the angular bearing, with respect to a base line of known length, of sound or radio waves emitted from a point on the machine, is measured. This requires a relatively long base line and highly sensitive and precise devices for measuring the angles. The computations also can be time consuming.

A variation of such method, in which the length of the lines from the machine to the two points on the base line is determined, also has been considered. Since the machine is inaccessible and invisible, the time for a specific sound impulse to travel through the earth to each of two points on the base line could be determined. Such method is impractical because the average speed of sound through the earth along two different paths will vary if these paths contain cracks or other irregularities, such as are known to be present.

Another way for determining the location of the machine is by plotting its path from the starting point. If the compass bearing of the machine is known at all times, and the distance traveled on each bearing, such path can be plotted. The large ferrous mass of the machine, however, so distorts the earth's magnetic field that a magnetic compass is useless, and the random drift of a gyrocompass during the relatively long period that the machine is underground results in sufficient inaccuracies to render it impractical.

Since the determination of the compass bearing is impractical, we have devised another method of plotting the path of the machine which comprises dividing the path into short increments of known lengths, and measuring the angle between each increment and the preceding one.

According to our invention there is also provided a novel device to measure such angle with a high degree of precision (i.e., with an error of less than one minute of arc) and transmit this measurement to the operator's station on the surface. An auxiliary device measures the length of each increment.

Since the machine and first section of conveyor immediately following the machine both fit the hole rather snugly, the machine can be said to occupy an increment of length of the hole, and the first conveyor section the preceding increment. Thus, measuring the angle between such two units serves to measure the angle between the two increments of length.

The first conveyor section is attached to the machine by a ball-and-socket type hitch, to permit relative motion in all planes between the two units, without looseness or lost motion. The ball member is mounted on a vertical cantilevered stud at the front of such conveyor section, while the socket member is rigidly attached to the rear of the machine. The cantilevered stud is hollow, and a cylindrical pin is mounted therein horizontally along a diameter of the ball. A fork on the end of a vertical shaft engages the cylindrical pin, so that any rotation of the hollow cantilevered stud about its vertical axis causes rotation of the forked shaft about its axis, but motion of the hollow cantilevered pin about any other axis produces no rotation of the forked shaft. The forked shaft is mounted in bearings attached to the machine, and its rotation is transmitted by an amplifying gear train to the shaft of a potentiometer. Rotation of the potentiometer shaft causes a slider to move along a resistance, changing the characteristics of an electrical circuit which includes a voltmeter at the operator's station.

While this invention is best suited for enabling the operator to steer along a straight path, i.e. the angle between increments being maintained at 180°, it may also be used to steer along a path of any desired direction.

In the drawing:

Fig. 1 is a fragmentary view in horizontal section of a bore mining operation illustrating the invention;

Fig. 2 is a vertical cross sectional view taken on line 2—2 of Fig. 1; and

Fig. 3 is a fragmentary circuit diagram of the electrical part of the angle-measuring device.

Attached to the rear end of the mining machine M is a hitch 1 to which is welded a generally horizontal hitch body housing 2 having an opening 3 in which is mounted a socket member 4 composed of upper and lower sphere parts 5 and 6. These parts are secured in place by a housing cap 7 that is secured to the top of the housing 2 by cap screws 8. Disposed within the socket member 4 is a ball member 9 provided with a tapered hole 10 that is rigidly fitted to a correspondingly tapered portion 11 of an upright cantilevered stud 12 which is welded to the front hitch 13 of a conveyor section C following the machine M.

The ball member 9 is prevented from turning on the stud 12 by a key 14, while axial movement is prevented by a lock-nut 15 and washer 16, the former being threaded to the upper end portion of the stud. Such stud is provided with a vertical recess 17 in the upper end portion thereof for accommodating the lower end portion 18 of a vertical shaft 19, the upper portion of which is mounted for rotational movement in a vertical way 20 in the top of the housing 7, ball bearings 21 being provided therebetween. The lower end portion 18 of the shaft 19 is forked. The tines 22 of the fork bear on opposite sides of a horizontal pin 23 mounted on the stud 12 in the recess 17 near the bottom thereof. Secured to the upper end of the shaft 19 is a horizontal gear 24 which meshes with a pinion gear 25 of a potentiometer 26 that is mounted on a bracket 27 that is, in turn, mounted on the top of the housing cap 7. The potentiometer shaft can be turned through an indefinite number of revolutions, since it has no internal stops. Such mechanism is protected from coal and other dust by a cover 28 that is secured to the housing cap 7 by cap screws 29.

As shown in Fig. 3 the potentiometer 26 comprises a resistor 30, and a movable contactor 31 that is mechanically connected to the pinion gear 25. The resistor 30 is energized by a suitable source 32 of current at constant potential, such as a battery, through conductors 33 and 34. The angular position of the contactor 31 is indicated by voltmeter 35 that is also electrically connected to the conductors 33 and 34 through a resistor 36, and to the contactor 31 by a medial conductor 37. The voltmeter 35 is preferably located in the control station 38 of the mining system, which station is usually remotely located with respect to the machine M itself.

In the operation of the illustrated apparatus, any angular displacement of the mining machine M with respect to the conveyor section C in a horizontal plane is transmitted to the shaft 19 which operates the potentiometer contactor 31 through gears 24 and 25, and such angular displacement is transmitted through the electrical circuit of Fig. 3 to the voltmeter 35 which indicates the direction and degree of such angle.

By reference to such voltmeter 35 which is located in the control station of the mining system, the course of the machine is plotted and the operator steers the machine by remote control to bore each adjacent hole, to plot a course corresponding to the preceding hole, so that the intervening wall is of substantially uniform width from beginning to end.

The device of the invention comprising the feature of the cylindrical pin having a longitudinal axis that coincides with a diameter of the ball of a ball-and-socket type joint, plus the fork engaging such pin, can be used in any mechanism where it is desired to transmit rotation in only one of three possible planes of rotation at right angles to one another.

What is claimed is:

1. Apparatus for measuring the angle between a mining machine unit and a first conveyor section unit attached to said mining machine unit, comprising a ball-and-socket type hitch permitting relative motion in all planes between said two units, without looseness or lost motion, the ball member being mounted at the front of such conveyor section, while the socket member is rigidly attached to the rear of the machine, said ball member being hollow, and having a cylindrical pin mounted therein horizontally along a diameter of the ball, a vertical shaft, a fork on the end of said vertical shaft engaging said cylindrical pin, so that any rotation of the ball member about its vertical axis causes rotation of the forked shaft about its axis, but motion of the ball member about any other axis produces no rotation of the forked shaft, said forked shaft being mounted in bearings attached to the socket member, and means for indicating the degree of angular rotation of said shaft with respect to said socket member.

2. A device comprising a ball-and-socket type coupling for connecting two vehicular units, including means for measuring the angle therebetween only in a horizontal plane while permitting universal movement between such units within a certain range in that as well as other planes, comprising a cantilever stud fixed to one unit, said stud having a recess extending inwardly from the top of said stud, a ball member mounted on said stud, a transverse pin mounted on said stud within said recess so that the longitudinal axis of the pin coincides with a diameter of the ball of said ball member, a socket member fixed to the other unit, said socket member having a socket containing said ball, a cap mounted on said socket member and having a bearing above and in line with such recess, a shaft journaled in said bearing and having a forked lower end engaging said pin, a potentiometer mounted on said cap and having a pinion gear generally parallel to said shaft, a gear keyed to said shaft and meshing with said pinion gear, means for electrically energizing said potentiometer, and a remotely stationed voltmeter electrically connected to said potentiometer for indicating such angle depending upon the relative rotation of said shaft with respect to said cap.

3. A device comprising a ball-and-socket type coupling for connecting two bodies, including means for measuring the angle therebetween in only one of three possible planes of rotation at right angles to one another while permitting universal movement between such bodies within a certain range in that as well as other planes, comprising a cantilever stud fixed to one body, said stud having a recess extending inwardly from the top of said stud, a ball member mounted on said stud, a transverse pin mounted on said stud within said recess so that the longitudinal axis of said pin coincides with a diameter of the ball of said ball member, a socket member fixed to the other body, said socket member having a socket containing said ball, a cap mounted on said socket member and having a bearing above and in line with such recess, a shaft journaled in said bearing and having a forked end engaging said pin, means for transmitting impulses corresponding to rotation of said shaft in said bearing to a receiving station, and means at said station for receiving such impulses and indicating such angle.

4. Apparatus for indicating the angle in a horizontal plane between a mining machine and a conveyor section coupled thereto, which comprises a ball-and-socket type hitch coupling the front end of said conveyor section to the rear end of said machine, said ball-and-socket hitch including a ball member having a vertical recess therein, a horizontal pin mounted on said ball member in said recess, the longitudinal axis of said pin coinciding with a diameter of said ball member, a vertical shaft journaled for rotation in said socket member, means connecting one end of said shaft with said pin for freedom of tilting movement about such axis of said pin and for rotating said shaft on its vertical axis in accordance with any angular displacement in a horizontal plane only between said ball and socket members, and means for indicating the degree of such angular displacement.

5. In a bore mining system provided with a bore mining machine and a first conveyor section, apparatus for continuously determining the location of said remotely controlled bore mining machine with respect to the horizontal direction of its progress in a bore hole, comprising means coupling the front of said conveyor section to the rear of said machine including a front hitch attached to said conveyor section, a vertical stud mounted on said hitch, a ball member mounted on said stud, a rear hitch attached to said machine, a socket member rigidly attached to said rear hitch, said socket and ball members providing a ball-and-socket type joint, said stud having a recess in the top thereof, a horizontal pin mounted on said stud in said recess, the longitudinal axis of said pin coinciding with a diameter of said ball, a cap mounted on said rear hitch, said cap having a vertical bearing way above said stud recess, a vertical shaft mounted for rotation in said bearing way, said shaft having a fork the tines of which engage said pin, so that any rotation of said stud about its vertical axis causes rotation of said shaft about its axis, but motion of the stud about any other axis produces no rotation of the shaft, whereby the rotary movement imparted to said shaft by said stud is an accurate measure of the precise angle between said ball and socket members only in a horizontal plane, and means for indicating such angle.

6. Apparatus as defined by claim 5, in which said indicating means comprises a potentiometer mounted on said cap, movement transmitting means mechanically connecting said shaft to said potentiometer, and a voltmeter electrically connected to said potentiometer for continuously indicating such angle at a remote control station for said bore mining system.

7. Apparatus for continuously determining the location of a remotely controlled mining machine with respect to the horizontal direction of its progress in mining, comprising means coupling the front of a conveyor section to the rear of said machine including a front hitch attached to said conveyor section, a ball member mounted on said hitch, a rear hitch attached to said machine, a socket member attached to said rear hitch, said socket and ball members providing a ball-and-socket type joint, said ball member having a recess, a horizontal pin mounted on said ball member in said recess, the longitudinal axis of said pin coinciding with a diameter of said ball, a cap mounted on said rear hitch, said cap having a vertical bearing way in line with said recess, a vertical shaft mounted for rotation in said bearing way, said shaft having a fork engaging said pin, so that any rotation of said ball member about a vertical axis causes said pin to rotate said shaft, but motion of the ball member about any other axis produces no rotation of the shaft, whereby the rotary movement imparted to said shaft by said ball member through said pin is an accurate measure of the precise angle between said ball and socket members only in a horizontal plane, and means for indicating such angle.

8. Apparatus as defined by claim 7, in which said indicating means comprises a potentiometer mounted on said cap, movement transmitting means mechanically connecting said shaft to said potentiometer, and a voltmeter electrically connected to said potentiometer for indicating such angle at a remote control station for said bore mining system.

9. A device comprising a ball-and-socket type coupling for connecting two bodies, including means permitting universal movement between such bodies within a certain range, and means for measuring the angle between such bodies in only a selected one of three possible planes of rotation at right angles to one another while permitting such movement in that as well as other planes, comprising members operatively associated with said coupling, said members being arranged substantially at right angles to each other with the longitudinal axis of one of said members lying in said selected plane and passing through the center of said coupling, and the longitudinal axis of said other member also passing through such center, said members being pivotally coupled so that movement of said one member in the selected plane turns said other member about the longitudinal axis thereof while permitting free pivotal movement between said members in the remaining two planes, and means connected to the latter member that is responsive to the angular displacement thereof due to such turning movement, whereby said angle measuring means is responsive to angular displacement in only said selected one of such three possible planes of rotation, about said axis of said other member that passes through the center of said coupling at substantially right angles to said plane.

10. Apparatus for bore mining by remote control which comprises a mining machine having attached thereto a train of conveyor sections, the first of which is coupled to the machine by a device comprising a ball-and-socket type coupling as defined by claim 9, by means of which information the course of the machine can be guided in such selected plane.

References Cited in the file of this patent

UNITED STATES PATENTS

| | | |
|---|---|---|
| 2,213,221 | Johnson | Sept. 2, 1940 |
| 2,214,161 | Cater | Sept. 10, 1940 |
| 2,515,251 | Morris | July 18, 1950 |
| 2,651,513 | Ramsay | Sept. 8, 1953 |
| 2,761,666 | Heimaster et al. | Sept. 4, 1956 |
| 2,780,451 | Alspaugh et al. | Feb. 5, 1957 |

FOREIGN PATENTS

| | | |
|---|---|---|
| 706,200 | Great Britain | Mar. 24, 1954 |